No. 653,885. Patented July 17, 1900.
W. F. RICHARDS.
CASING FOR ELECTRIC CAR LIGHTING APPARATUS.
(Application filed Apr. 4, 1900.)
(No Model.) 3 Sheets—Sheet 2.
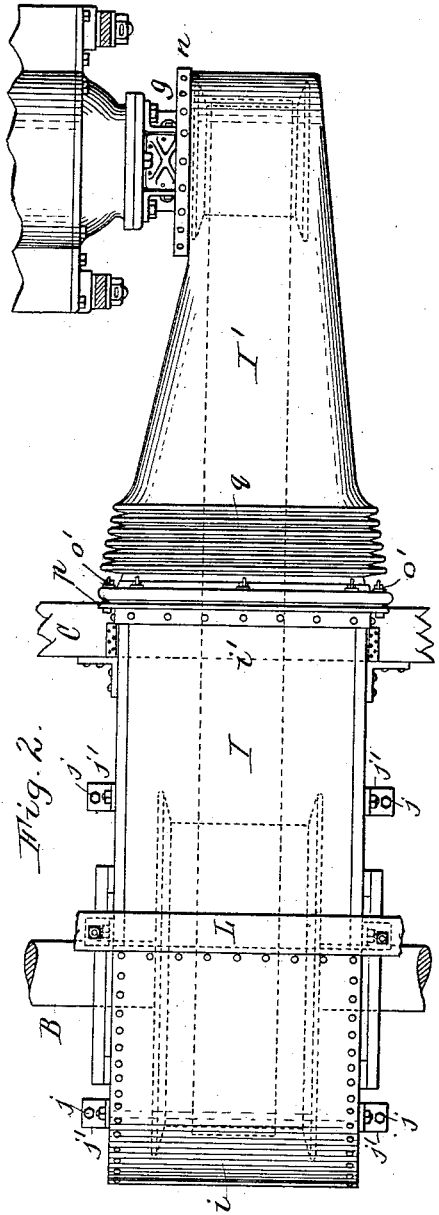
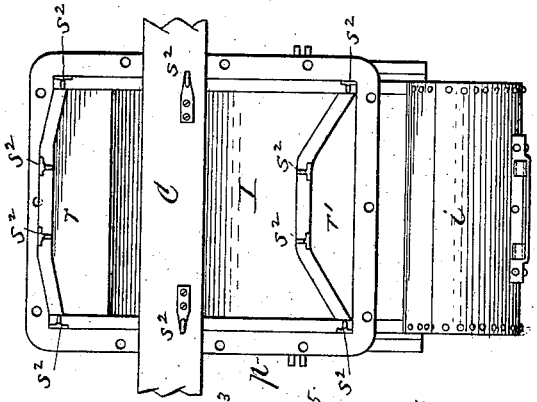
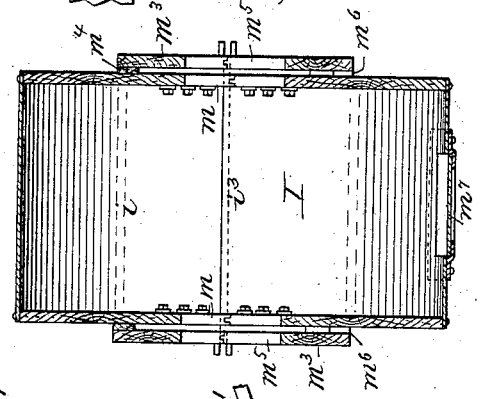
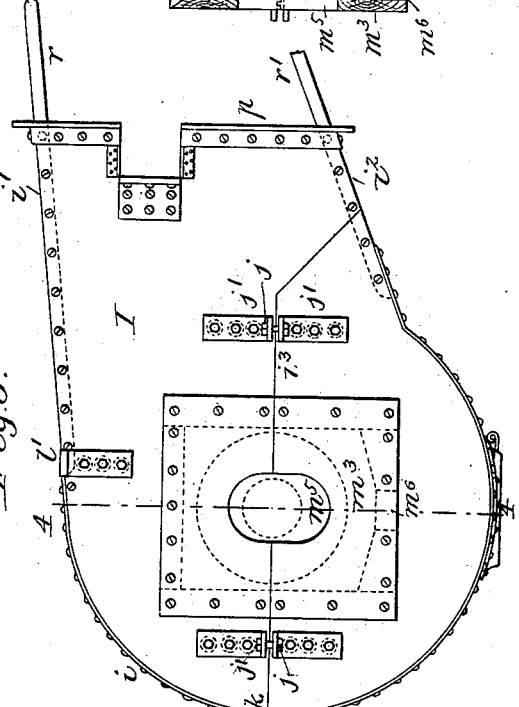
Witnesses:
Henry L. Deck.
F. F. Schurzinger
W. F. Richards, Inventor.
By Wilhelm Bonner, Attorneys.

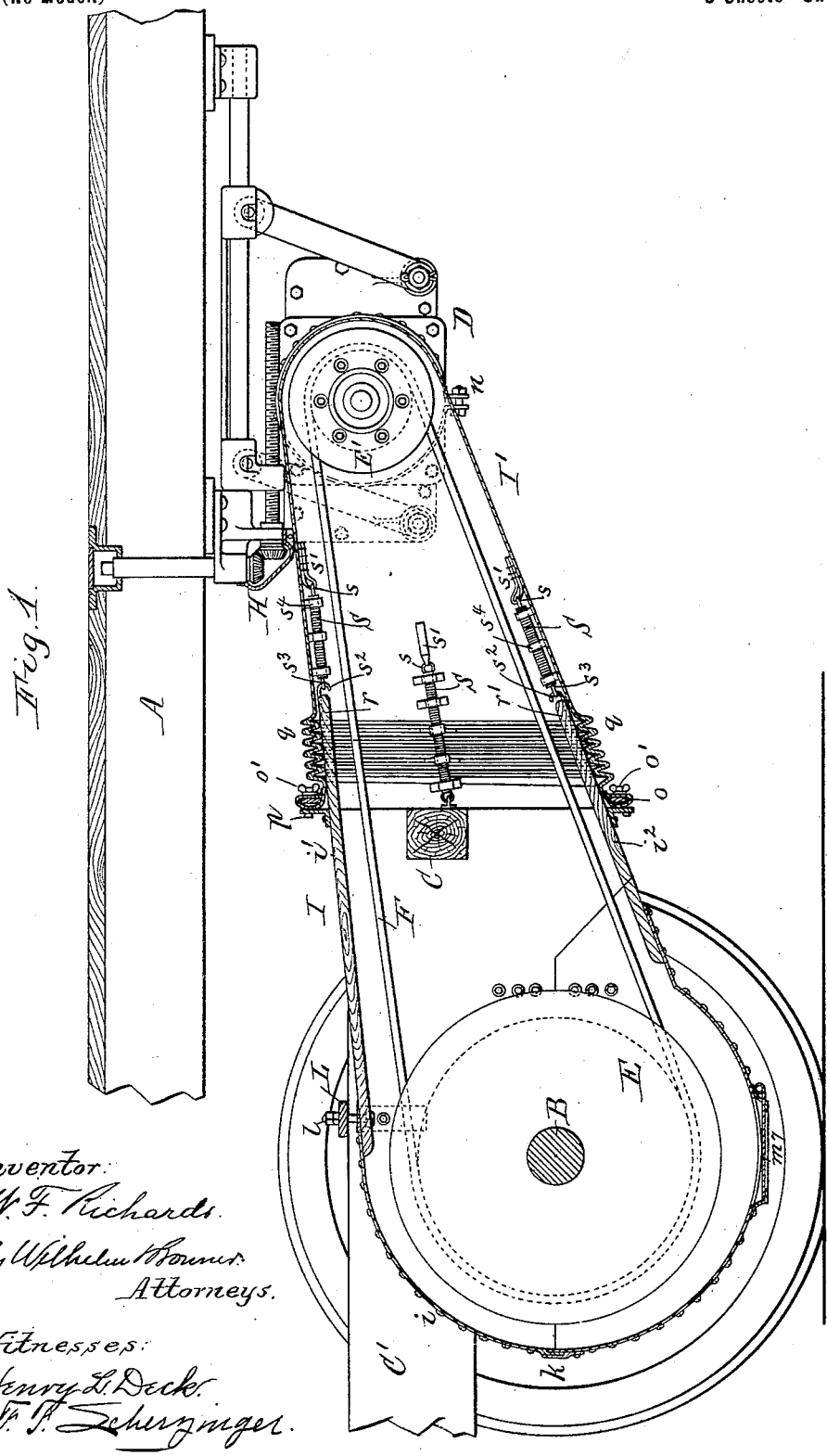

No. 653,885. Patented July 17, 1900.
W. F. RICHARDS.
CASING FOR ELECTRIC CAR LIGHTING APPARATUS.
(Application filed Apr. 4, 1900.)
(No Model.) 3 Sheets—Sheet 3.
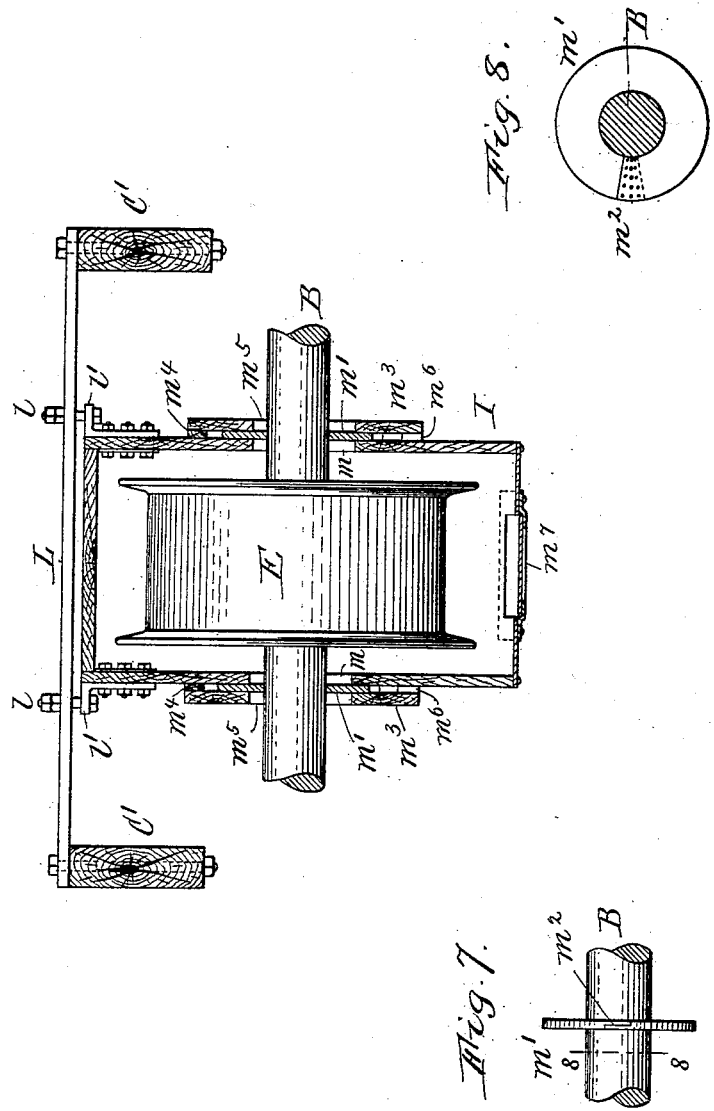

UNITED STATES PATENT OFFICE.

WILLARD F. RICHARDS, OF BUFFALO, NEW YORK, ASSIGNOR TO CHARLES M. GOULD, OF NEW YORK, N. Y.

CASING FOR ELECTRIC CAR-LIGHTING APPARATUS.

SPECIFICATION forming part of Letters Patent No. 653,885, dated July 17, 1900.

Application filed April 4, 1900. Serial No. 11,493. (No model.)

*To all whom it may concern:*

Be it known that I, WILLARD F. RICHARDS, a citizen of the United States, residing at Buffalo, in the county of Erie and State of New York, have invented new and useful Improvements in Casings for Electric Car-Lighting Apparatus, of which the following is a specification.

This invention relates to a casing or housing for the driving mechanism of the dynamos which are employed in the electric-lighting apparatus of railway-cars in which the dynamo is arranged on the under side of the car-frame or car-body and driven from one of the car-axles. A casing of this general character is shown and described in Letters Patent of the United States No. 612,139, granted to me October 11, 1898. The casing of that patent is composed of two parts, one inclosing the driving mechanism on the car-axle and the other the driven mechanism on the dynamo, and these two parts are connected by a telescopic joint, which permits the casing to accommodate itself to the changes in the relative position of the dynamo and car-axle which follow from the swiveling movements of the car-truck and also from the movements of the dynamo toward and from the car-axle when the dynamo is so mounted as to be capable of such movement. The telescopic joint between the two parts of this casing is, however, more or less open, and therefore does not exclude dust, cinders, snow, &c., entirely from the driving mechanism.

The object of my present invention is to provide a durable and inexpensive casing which has no such open joint and effectually excludes dust, cinders, snow, &c., from the driving mechanism and which provides the necessary flexibility in the casing to enable the latter to accommodate itself to the variations in the relative position of the axle and dynamo and which also permits convenient access to the driving mechanism for inspection, repairs, and renewals of parts when necessary.

In the accompanying drawings, consisting of three sheets, Figure 1 is a vertical longitudinal section of my improved casing applied to a railway-car, only such parts of the car-truck being shown as are necessary to show the application of the casing. Fig. 2 is a top plan view of the casing and a portion of the dynamo. Fig. 3 is a detached side elevation of the rigid section of the casing. Fig. 4 is a cross-section in line 4 4, Fig. 3. Fig. 5 is an end elevation of the front section of the casing viewed from its rear end. Fig. 6 is a transverse vertical section of the casing and the adjacent portion of the car-truck, the plane of the section being through the driving-axle. Fig. 7 is a fragmentary elevation of said driving-axle, showing one of the dust-excluding washers. Fig. 8 is a transverse section in line 8 8, Fig. 7.

Like letters of reference refer to like parts in the several figures.

A is the car frame or body; B, one of the car-axles; C, one of the end pieces of the adjacent truck-frame, and C' the safety-beams.

D is the dynamo, which is mounted on the car and movable toward and from the car-axle B in a well-known manner.

E E' are the pulleys, mounted on the car-axle and the dynamo-shaft, and F is the driving-belt, which runs around the same.

$g$, Fig. 2, is the usual housing, which projects from the side of the dynamo-frame and incloses the dynamo-shaft.

The dynamo is constantly moved away from the driving-axle by any suitable tension device H, which forms no part of my present invention.

The casing which incloses the driving-belt and pulleys is composed of two main sections I I', which are carried by the car-truck and the dynamo-frame, respectively. The front section I is constructed in the form of a rectangular box or inclosure which is open at its inner or rear end and closed at its front end by a curved wall $i$, which follows the contour of the axle-pulley E. The side walls of said front section and the flat rear portions $i'$ $i^2$ of its top and bottom are preferably constructed of wood, while the curved front portion $i$ is constructed of sheet metal, which is secured to the curved edges of the side walls and the flat top and bottom boards $i'$ $i^2$ by screws or other suitable means. The front section I is provided with a removable lower portion or section which joins its stationary upper portion on a substantially-horizontal line passing through the driving-axle, as shown at $i^3$, said parts of the casing being preferably provided with a groove-and-tenon joint, as shown in Fig. 4. This removable section is detachably secured to the main section by vertical bolts $j$, which pass through perforated ears $j'$, secured to the adjoining portions of said sections, as shown in Figs. 2 and 3. The adjoining upper and lower portions of the divided sheet-metal front wall $i$ are preferably interlocked at their front ends by a double lap-joint $k$, as shown in Figs. 1 and 3. The front section I is suspended from a rigid cross-bar L of the truck-frame by vertical bolts $l$, which pass through openings formed in said bar and through perforated ears $l'$, secured to the side walls of said section, near the top thereof. The cross-bar L is secured to the safety-beams C', as shown in Fig. 6. The front section of the casing is provided in opposite sides with slots or vertically-elongated openings $m$, through which the car-axle passes and in which the axle plays. Dust and snow are prevented from entering these openings so far as practicable by vertical shields, disks, or washers $m'$, which snugly surround the axle and bear against the outer sides of the casing. These washers are split, as shown at $m^2$, Figs. 7 and 8, so that they can be sprung over the axle, and their ends are secured together by wooden pegs or other suitable means. The washers play vertically in pockets or chambers arranged on the outer sides of the casing around the openings $m$ and formed by divided cap-plates $m^3$, which are separated at their edges from the side walls of the casing by intervening strips $m^4$. These cap-plates are provided with vertical slots $m^5$ for the passage of the car-axle. The washers are of sufficient diameter to cover the axle-openings $m$ in all positions of the axle, as shown by dotted lines in Fig. 3. Each of the washer-pockets is provided in its bottom with an opening $m^6$ for the discharge of any dust which may enter the pocket. The front portion of the casing is provided in its bottom with a dust-discharge opening which is closed by a door or slide $m^7$.

The rear section I' of the casing is constructed of heavy canvas or other suitable flexible material. This rear section is rectangular in cross-section, similar to the front section, and its rear portion, which incloses the driving-pulley of the dynamo, is closed on all sides. Its inner rear portion is provided with an opening for the passage of the dynamo-pulley, and said portion is fitted over the cylindrical outer end of the housing $g$ and tightly secured thereto by a splint clamping-band $n$ or any other suitable means, as shown in Figs. 1 and 2. The front end of the flexible rear section is secured to the rear end of the rigid front section I by any suitable fastening or clamping devices which permit the sections to be readily disconnected when necessary. The preferred means shown in the drawings consist of an upright rectangular clamping-frame $o$, around which the front end of the canvas section is folded and sewed, and thumb-screws or bolts $o'$, which pass through said frame and enter openings formed in a flange $p$, secured to the adjacent rear portion of the front section I. By this construction the folded front end of the canvas section is securely clamped between the flange $p$ and the clamping-frame $o$ upon tightening said thumb-screws.

The flexible section I' is provided adjacent to its front end with a series of transverse plaits or bellows folds $q$, which render said section extensible and permit the casing to lengthen or shorten in following the movements of the dynamo toward and from the driving-axle. The plaited upper portion of the canvas section is supported and prevented from collapsing by a rearward extension $r$ of the top board of the rigid section. The driving-belt F is prevented from chafing against the plaited lower portion of the canvas by a similar extension $r'$ of the bottom board of the rigid section, as shown in Fig. 1. The side walls of the rigid section I preferably terminate at the rear side of the truck-beam C and are provided with notches or recesses which receive said beam, as shown in Figs. 1 and 3.

S represents springs which resist the extension of the plaited rear section of the casing and which tend to contract its plaits. These springs are arranged lengthwise of the casing and located at suitable intervals around the interior thereof. They are secured at their rear ends to the inner side of the canvas section, preferably by rings $s$ and loops $s'$, and their front ends are detachably connected with the rear end of the rigid casing-section I and with the end piece C by hooks $s^2$ and rings or eyes $s^3$, so that the springs can be readily detached from said beam and the front section in disconnecting the two sections of the casing for examining the inclosed driving mechanism. The walls of the canvas section are also preferably connected with the bodies of the springs S by loops $s^4$, which are secured to said walls and loosely embrace the springs. In the construction shown in the drawings ten of such springs are employed, four springs being located at the top of the casing, four at the bottom thereof, and two between the top and bottom, adjacent to the side walls, as will be understood from the location of the spring-attaching hooks $s^2$ in Fig. 5.

The pulley E on the driving-axle is of sufficient width to allow the driving-belt to shift laterally on the same when the truck turns or swivels out of line with the car-body in rounding a curve. The flexible rear portion of the casing is preferably tapered toward the dynamo-pulley, as shown in Fig. 2.

The plaited portion $q$ of the casing while allowing the same to lengthen and contract in adapting itself to the varying distance between the driving-axle and the movable dynamo also permits the necessary lateral or angular movement of the front section of the casing relatively to the rear section in passing around a curve. Under these conditions the plaits which face the inner side of the curve are contracted and those facing the outer side of the curve are extended, and as soon as the car passes upon a straight section of track the plaits resume their normal condition under the action of the springs S.

My improved construction while permitting of the various movements of the casing hereinbefore described insures a tight and reliable joint between the sections of the casing and forms a practically dust and snow proof inclosure for the driving mechanism of the dynamo.

I claim as my invention—

1. A tight casing for the dynamo driving mechanism of electric car-lighting apparatus inclosing the driving part on the car-axle, the driven part on the dynamo and the connecting part and having between its end portions an extensible and flexible portion which is tightly connected with the adjacent portions of the casing and which permits the latter to lengthen and contract and to bend laterally in accommodating itself to the variations in the relative position of the dynamo and car-axle, substantially as set forth.

2. A casing for the dynamo driving mechanism of electric car-lighting apparatus composed of front and rear sections mounted on the car-truck and the dynamo, respectively, one of said sections being secured to the opposing section and provided with bellows folds or plaits, substantially as set forth.

3. A casing for the dynamo driving mechanism of electric car-lighting apparatus composed of front and rear sections mounted on the car-truck and the dynamo, respectively, one of said sections being secured to the opposing section and provided with bellows folds, and springs arranged to contract said folds, substantially as set forth.

4. A casing for the dynamo driving mechanism of electric car-lighting apparatus, composed of front and rear sections mounted on the car-truck and the dynamo, respectively, said sections being detachably secured together at their adjoining ends and one of said sections being provided with plaits or bellows folds, and contracting-springs for said folds secured at one end to one of said sections and having their opposite ends detachably connected with the other section, substantially as set forth.

5. A casing for the dynamo driving mechanism of electric car-lighting apparatus, composed of a front section mounted on the car-truck, and a flexible rear section mounted on the dynamo and provided at its front end with a clamping-frame and adjacent to said frame with bellows folds, and clamping devices for securing said frame to the adjacent end of the front section, substantially as set forth.

6. A casing for the dynamo driving mechanism of electric car-lighting apparatus composed of a rigid front section having its front portion supported on the car-truck, and a rear section of flexible material having a closed rear portion which is supported on the dynamo, said flexible section being secured at its front end to said rigid section and provided with bellows folds, substantially as set forth.

7. A casing for the dynamo driving mechanism of electric car-lighting apparatus composed of front and rear sections mounted on the car-truck and the dynamo, respectively, one of said sections being secured at its inner end to the other section and provided adjacent to its inner end with plaits or bellows folds, and the opposing section being provided with an extension or extensions which enter the plaited section and support its plaits or folds, substantially as set forth.

8. A casing for the dynamo driving mechanism of electric car-lighting apparatus, composed of a rear section mounted on the dynamo, and a front section mounted on the car-truck and having an extensible connection with the rear section and provided with a removable lower portion or section for affording access to the interior of the casing, substantially as set forth.

9. A casing for the dynamo driving mechanism of electric car-lighting apparatus, provided with vertical slots for the passage of a car-axle, pockets surrounding said openings, and vertical shields or washers mounted on said axle and sliding in said pockets, substantially as set forth.

Witness my hand this 31st day of March, 1900.

WILLARD F. RICHARDS.

Witnesses:
JNO. J. BONNER,
CLAUDIA M. BENTLEY.